United States Patent
Chen

(10) Patent No.: US 10,200,280 B2
(45) Date of Patent: *Feb. 5, 2019

(54) SOFTWARE-DEFINED NETWORK FOR TEMPORAL LABEL SWITCHED PATH TUNNELS

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/178,151

(22) Filed: Jun. 9, 2016

(65) Prior Publication Data

US 2016/0380888 A1    Dec. 29, 2016

Related U.S. Application Data

(60) Provisional application No. 62/184,645, filed on Jun. 25, 2015.

(51) Int. Cl.
*H04L 12/723* (2013.01)
*H04L 12/913* (2013.01)

(52) U.S. Cl.
CPC .......... *H04L 45/50* (2013.01); *H04L 47/724* (2013.01)

(58) Field of Classification Search
CPC .... H04L 12/4633; H04L 45/50; H04L 47/825
See application file for complete search history.

(56) References Cited

U.S. PATENT DOCUMENTS

| | | | |
|---|---|---|---|
| 7,319,700 B1 | 1/2008 | Kompella | |
| 8,107,379 B2 | 1/2012 | Vasseur | |
| 8,717,899 B2 | 5/2014 | Boutros et al. | |
| 9,258,210 B2 | 2/2016 | Torvi | |
| 9,819,580 B2 * | 11/2017 | Chen | H04L 45/50 |
| 2002/0176370 A1 * | 11/2002 | Ohba | H04L 49/309 370/252 |
| 2004/0042406 A1 | 3/2004 | Wu et al. | |
| 2004/0073650 A1 | 4/2004 | Nakamura | |

(Continued)

OTHER PUBLICATIONS

Chen, H., et al, "Framework for Temporal Tunnel Services draft-chen-teas-frmwk-tts-01.txt," Internet Engineering Task Force, Standards Track, Mar. 21, 2016, 25 pages.

(Continued)

*Primary Examiner* — Mohamed A Kamara
*Assistant Examiner* — Ryan C Kavleski
(74) *Attorney, Agent, or Firm* — Conley Rose, P.C.

(57) ABSTRACT

A method implemented by a temporal tunnel service (TTS) controller, comprising computing a path in a network for a temporal label switched path (LSP), wherein the path satisfies a network constraint in a time interval comprising a predetermined start time and a predetermined end time, reserving, at a current time prior to the predetermined start time, a network resource along the path computed for the temporal LSP, wherein the network resource is reserved for the temporal LSP to carry traffic in the time interval, and creating the temporal LSP in the network by sending a route configuration instruction to each node along the path of the temporal LSP.

20 Claims, 11 Drawing Sheets

(56) References Cited

U.S. PATENT DOCUMENTS

| | | | |
|---|---|---|---|
| 2005/0089327 A1* | 4/2005 | Ovadia | H04L 45/04 398/47 |
| 2006/0101142 A1 | 5/2006 | Vasseur et al. | |
| 2007/0160061 A1 | 7/2007 | Vasseur | |
| 2007/0165515 A1 | 7/2007 | Vasseur | |
| 2008/0123533 A1 | 5/2008 | Vasseur et al. | |
| 2008/0304501 A1 | 12/2008 | Park et al. | |
| 2009/0274464 A1 | 11/2009 | Zi et al. | |
| 2010/0220996 A1 | 9/2010 | Lee et al. | |
| 2011/0090785 A1 | 4/2011 | Shimizu et al. | |
| 2012/0147895 A1* | 6/2012 | Choudhury | H04L 45/125 370/401 |
| 2015/0245392 A1* | 8/2015 | Chan | H04W 76/32 370/331 |
| 2016/0308786 A1* | 10/2016 | Chen | H04L 47/825 |
| 2016/0344626 A1* | 11/2016 | Chen | H04L 45/50 |
| 2017/0332423 A9* | 11/2017 | Iyer | H04W 76/023 |
| 2018/0019930 A1* | 1/2018 | Bruno | H04L 41/147 |

OTHER PUBLICATIONS

Crabbe, E., et al, "PCEP Extensions for PCE-initiated LSP Setup in a Stateful PCE Model draft-ieff-pce-pce-initiated-lsp-04," PCE Working Group, Standards Track, Apr. 17, 2015, 17 pages.

Crabbe, E., et al, "PCEP Extensions for Stateful PCE draft-ieff-pce-stateful-pce-11," PCE Working Group, Standards Track, Apr. 20, 2015, 47 pages.

Bradner, S., "Key words for use in RFCs to Indicate Requirement Levels," Network Working Group, RFC 2119, Mar. 1997, 3 pages.

Moy, J., "OSPF Version 2," Network Group Group, RFC 2328, Apr. 1998, 244 pages.

Rosen, E., et al, "Multiprotocol Label Switching Architecture," Network Working Group, Standards Track, RFC 3031, Jan. 2001, 61 pages.

Awduche, D., et al, "RSVP-TE: Extensions to RSVP for LSP Tunnels," Network Working Group, Standards Track, RFC 3209, Dec. 2001, 61 pages.

Katz, D., et al, "Traffic Engineering (TE) Extensions to OSPF Version 2," Network Working Group, Standards Track, RFC 3630, Sep. 2003, 14 pages.

Farrel, A., et al, "A Path Computation Element (PCE)-Based Architecture," Network Working Group, RFC 4655, Aug. 2006, 40 pages.

Aggarwal, R., Ed. et al, "Extensions to Resource Reservation Protocol-Traffic Engineering (RSVP-TE) for Point-to-Multipoint TE Label Switched Paths (LSPs)," Network Working Group, Standards Track, RFC 4875, May 2007, 53 pages.

Berger, L., et al, "The OSPF Opaque LSA Option," Network Working Group, Standards Track, RFC 5250, Jul. 2008, 17 pages.

Vasseur, JP., Ed., et al, "Path Computation Element (PCE) Communication Protocol (PCEP)," Network Working Group, Standards Track, RFC 5440, Mar. 2009, 87 pages.

Yasukawa, S., et al, "Path Computation Clients (PCC)—Path Computation Element (PCE) Requirements for Point-to-Multipoint MPLS-TE," Internet Engineering Task Force (IETF), RFC 5862, Jun. 2010, 11 pages.

Zhao, Q., Ed., et al, "Extensions to the Path Computation Element Communication Protocol (PCEP) for Point-to-Multipoint Traffic Engineering Label Switched Paths," Internet Engineering Task Force (IETF), RFC 6006, Sep. 2010, 33 pages.

Chen, H., "Extensions to OSPF for Temporal LSP," draft-chen-ospf-tts-00.txt, Jul. 3, 2015, 12 pages.

Moy, J., "OSPF Version 2," RFC 2328, Apr. 1998, 201 pages.

Coltun, R., "The OSPF Opaque LSA Option," RFC 2370, Jul. 1998, 15 pages.

Office Action dated Oct. 20, 2017, 6 pages, U.S. Appl. No. 15/157,944, filed May 18, 2016.

Notice of Allowance dated Jan. 3, 2018, 9 pages, U.S. Appl. No. 15/157,944, filed May 18, 2016.

Notice of Allowance dated Sep. 1, 2017, 14 pages, U.S. Appl. No. 15/095,748, filed Apr. 11, 2016.

Office Action dated Apr. 11, 2018, 26 pages, U.S. Appl. No. 15/083,922, filed Mar. 29, 2016.

Office Action dated Oct. 18, 2017, 30 pages, U.S. Appl. No. 15/083,922, filed Mar. 29, 2016.

* cited by examiner

SOFTWARE-DEFINED NETWORK FOR TEMPORAL LABEL SWITCHED PATH TUNNELS

CROSS-REFERENCE TO RELATED APPLICATIONS

The present application claims priority to U.S. Provisional Patent Application 62/184,645 filed Jun. 25, 2015 by Huaimo Chen, and entitled "Software-Defined Network for Temporal Label Switched Path Tunnels," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a networking paradigm that decouples network control and forwarding functions. The decoupling of the control plane from the data plane allows for centralization of network control, enabling effective policy administration and flexible management. The centralization of network control facilitates various network functionalities, such as network measurements, traffic engineering, enhanced quality of services, and enhanced access control. With the growing availability of SDN-enabled nodes and protocols, such as OpenFlow, many organizations have started deploying SDN networks.

SUMMARY

In a SDN network, a SDN controller determines routes through the network and configures nodes in the network with routing instructions. In a SDN network that employs label switched paths (LSPs) for data transportation, a SDN controller provides a solution for creating LSPs in the network without employing Resource Reservation Protocol (RSVP). Every LSP created by the SDN controller is up forever and network resources are reserved for the LSP forever until the LSP is deleted. However, some LSPs may not be actively carrying traffic at all time. Thus, network resources may not be used efficiently. To resolve these and other problems, and as will be more fully explained below, a temporal tunnel service (TTS) controller is used to create temporal LSPs for carrying traffic at one or more particular time intervals according to users' requests and reserve network resources for the temporal LSPs in corresponding time intervals.

In one embodiment, the disclosure includes a method implemented by a network element (NE) configured as a TTS controller, comprising computing, via a processor of the NE, a path in a network for a temporal LSP, wherein the path satisfies a network constraint in a time interval comprising a predetermined start time and a predetermined end time, reserving, at a current time prior to the predetermined start time via the processor, a network resource along the path computed for the temporal LSP, wherein the network resource is reserved for the temporal LSP to carry traffic in the time interval, and creating the temporal LSP in the network by sending, via a transmitter of the NE, a route configuration instruction to each node along the path of the temporal LSP. In some embodiments, the disclosure also includes reserving the network resource by reserving a bandwidth on a link along the path in the time interval for the temporal LSP, and reserving a label on each node on the path in the time interval except an ingress node of the temporal LSP, and/or further comprising receiving a creation request to create the temporal LSP in the network for carrying the traffic in the time interval, wherein the creation request indicates the network constraint, the predetermined start time, and the predetermined end time, and wherein the path is computed in response to the creation request, and/or wherein the creation request further indicates a first absolute time of the predetermined start time, a second absolute time of the predetermined end time, a relative time of the predetermined start time, a period of the time interval, or combinations thereof, and/or wherein the creation request further indicates that the time interval is a recurring time interval, wherein computing the path in the network comprises determining that the path satisfies the network constraint in each recurring time interval, wherein reserving the network resource comprises reserving the network resource along the path for each recurring time interval, wherein sending the route configuration instruction to each node comprises sending the route configuration instruction at a beginning of each recurring time interval for creating a forwarding entry, and wherein the method further comprises sending a route removal instruction to each node to remove the forwarding entry at an end of each recurring time interval, and/or wherein the creation request further indicates that the time interval further comprises an elastic time range, and wherein computing the path in the network further comprises determining a minimum amount of time to shift the time interval from the predetermined start time such that the time interval after shifting satisfies the network constraint and is temporally positioned within the elastic time range, and/or further comprising allocating, via the processor, a global identifier (ID) for identifying the temporal LSP in the network, and storing, in a memory of the NE, path information associated with the temporal LSP, wherein the path information indicates the label, the global ID, the network resource, the time interval, a nodes sequence on the path, a status of the temporal LSP, or combinations thereof, and/or further comprising receiving, via a receiver of the NE, a deletion request to delete the temporal LSP from the network, releasing, via the processor, the network resource reserved for the temporal LSP, releasing, via the processor, the global ID allocated for identifying the temporal LSP, deleting, from the memory, the path information associated with the temporal LSP, and deleting the temporal LSP by sending, via the transmitter, a route removal instruction to each node to remove a forwarding entry for forwarding the traffic of the temporal LSP, and/or wherein the time interval is a recurring time interval, wherein releasing the network resource comprises releasing the network resource in each remaining recurring time interval, and wherein releasing the label comprises releasing the label in each remaining recurring time interval, and/or wherein the temporal LSP is a point-to-point (P2P) LSP, and/or wherein the temporal LSP is a point-to-multipoint (P2MP) LSP.

In another embodiment, the disclosure includes a network controller comprising a processor configured to compute a path in a network for a temporal LSP, wherein the path satisfies a network constraint in a first time interval comprising a predetermined start time and a predetermined end time, reserve, at a current time prior to the predetermined start time, a network resource along the path computed for the temporal LSP, wherein the network resource is reserved for the temporal LSP to carry traffic in the first time interval, and a transmitter coupled to the processor and configured to send a route configuration instruction to a each node on the path of the temporal LSP. In some embodiments, the disclosure also includes further comprising a receiver coupled to the processor and configured to receive a creation request to create the temporal LSP in the network for carrying the traffic in the first time interval, wherein the creation request indicates the network constraint and the first time interval, and wherein the path is computed in response to the creation request, and receive a deletion request to delete the temporal LSP from the network, wherein the processor is further configured to release the network resource reserved for the temporal LSP in response to the deletion request, and wherein the transmitter is further configured to send a route removal instruction to each node indicating removal of a forwarding entry for forwarding the traffic of the temporal LSP in response to the deletion request, and/or further comprising a memory coupled to the processor and configured to store a time-based traffic engineering link state database (TEDB) indicating unreserved network resource in a plurality of time intervals comprising the first time interval, wherein the processor is further configured to compute the path by determining that the path satisfies the network constraint in the first time interval according to unreserved network resource indicated in the time-based TEDB, reserve the network resource from the time-based TEDB by subtracting a first amount of the network resource from a second amount of unreserved network resource in the first time interval, and release the network resource to the time-based TEDB by adding the first amount of the network resource to a third amount of unreserved network resource for remaining time of the first time interval, and/or wherein the network resource comprises a bandwidth at a first priority of a plurality of bandwidth priorities associated with the link, and/or further comprising a memory coupled to the processor and configured to store a time-based label database (LDB) indicating availabilities of the label on a second node in a plurality of time intervals comprising the first time interval, wherein the processor is further configured to reserve the label on the second node from the time-based LDB by indicating in the time-based LDB that the label is reserved for the first time interval, and release the label on the second node to the time-based LDB by indicating in the time-based LDB that the label on the second node is available for remaining time of the first time interval, and/or further comprising a memory coupled to the processor and configured to store a time-based LSP database (LSPDB) indicating availabilities of a global ID, wherein the processor is further configured to allocate the global ID from the time-based LSPDB for identifying the temporal LSP in the network in response to the creation request by indicating in the time-based LSPDB that the global ID is allocated, store path information of the temporal LSP in association with the global ID in the time-based LSPDB, release the global ID to the time-based LSPDB in response to the deletion request by indicating in the time-based LSPDB that the global ID is available, and delete the path information from the time-based LSPDB in response to the deletion request.

In yet another embodiment, the disclosure includes an NE comprising a receiver configured to receive a route configuration instruction from a network controller to create a forwarding entry for forwarding traffic of a temporal LSP scheduled to carry the traffic in a network from a predetermined start time to a predetermined end time, wherein the route configuration instruction comprises a forwarding label, and receive a packet associated with the traffic of the temporal LSP at a time between the predetermined start time and the predetermined end time, a processor coupled to the receiver and configured to attach the packet with the forwarding label received from the network controller, and a transmitter coupled to the processor and configured to forward the packet attached with the forwarding label to a next hop node along a path of the temporal LSP according to the forwarding entry. In some embodiments, the disclosure also includes further comprising a memory coupled to the processor and configured to store the forwarding entry comprising the forwarding label, wherein the receiver is further configured to receive a route removal instruction from the network controller indicating removal of the forwarding entry for forwarding the traffic of the temporal LSP, and wherein the processor is further configured to delete the forwarding entry from the memory, and/or wherein the network is an SDN network, and wherein the route configuration instruction is received according to an interior gateway protocol (IGP), a border gateway protocol (BGP), a path computation element (PCE) communication protocol (PCEP), or an OpenFlow protocol.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Figure 1:
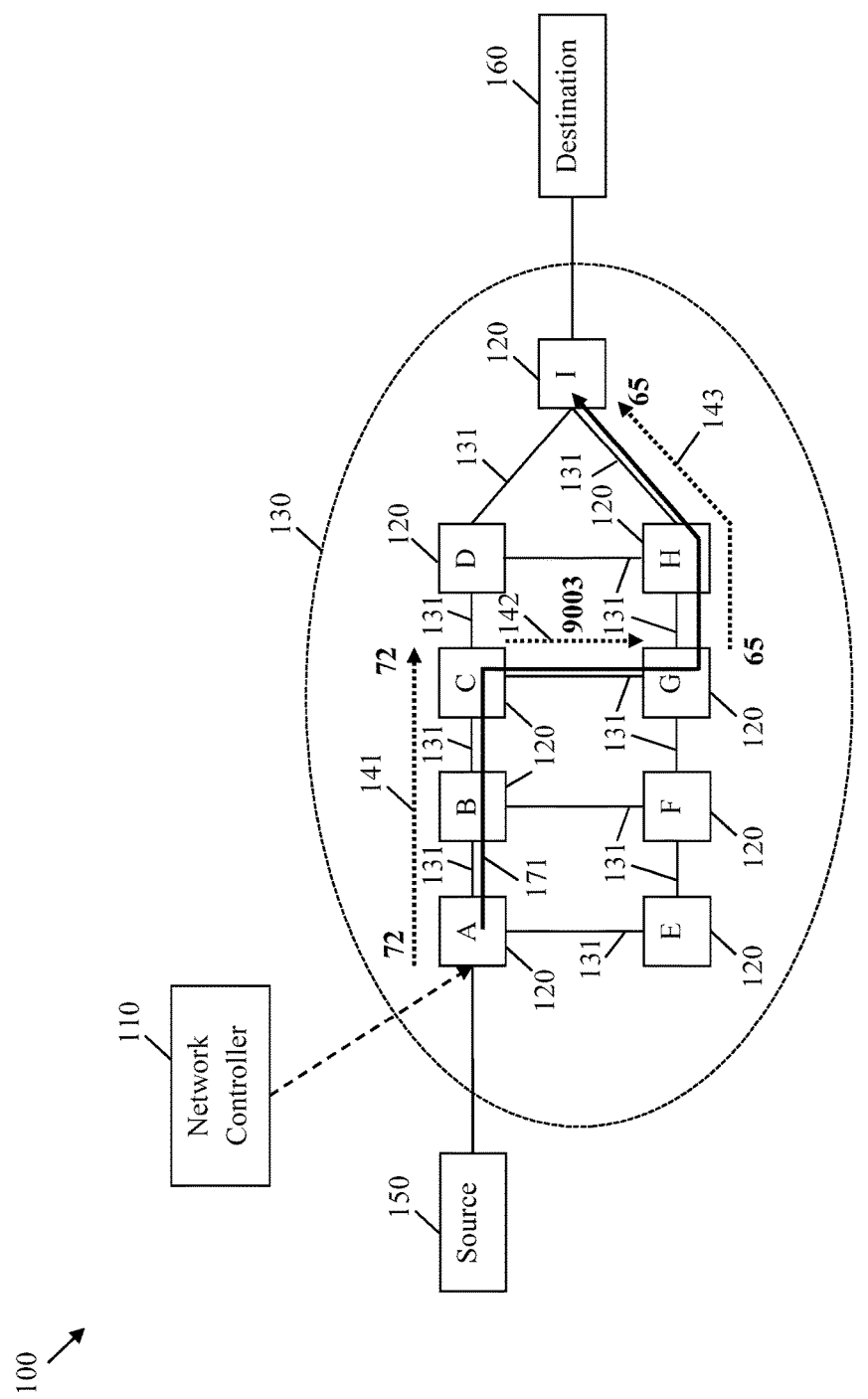
FIG. 1 is a schematic diagram of a segment routing (SR) network system.

FIG. 1 is a schematic diagram of an embodiment of a SR network system 100. The system 100 comprises a network controller 110 and a network 130 comprising a plurality of network nodes 120 (e.g., A, B, C, D, E, F, G, H, and I) interconnected by a plurality of links 131. The links 131 may comprise physical links, such as fiber optic links and/or electrical links, logical links such as multiprotocol label switching (MPLS) tunnels, or combinations thereof used to transport data. The network controller 110 is communicatively coupled to the network 130. The network 130 employs SR to transport packets through the network nodes 120 between a source 150 and a destination 160. The source 150 is any network device that is suitable for sourcing or generating packets and the destination 160 is any network device that is suitable for sinking or consuming packets. To employ SR, the network nodes 120 operate under a single networking domain, which is also be referred to as an SR domain. In an embodiment, the network nodes 120 operate under one networking domain and the source 150 and/or the destination 160 operate under other networking domains, which may employ any type of routing methods. In another embodiment, the network nodes 120, the source 150, and/or the destination 160 operate under the same networking domain. It should be noted that the source 150 and the destination 160 may not be directly connected to the network 130. For example, the source 150 and the destination 160 may be connected to intervening networks (not shown), which are interconnected by the network 130.

The network controller 110 may be a virtual machine (VM), a hypervisor, or any other device configured to manage the network 130, for example, by maintaining the network topology and statuses of the network 130 and determining routes through the network 130. The network controller 110 may be any type of network controller, such as a centralized controller or a distributed controller. In an embodiment, the network controller 110 is a SDN controller, such as an OpenFlow-enabled controller. In such an embodiment, the forwarding plane is decoupled from the control plane, and the network controller 110 configures each of the network nodes 120 with forwarding instructions, for example, in the form of one or more flow tables. It should be noted that although FIG. 1 depicts the network controller 110 as only coupled to the network node A 120, the network controller may be coupled to any of the network nodes 120 in the network 130.

In some embodiments, the network controller 110 explicitly specifies some or all connections and/or forwarding paths over which a data packet may traverse in the network 130. A route in the network 130 is identified by segment labels. As shown, a first segment 141 from the network node A 120 to the network node C 120 is identified by a first segment label 72, a second segment 142 from the network node C 120 to the network node G 120 is identified by a second segment label 9003, and a third segment 143 from the network node G 120 to the network node I 120 is identified by a third segment label 65. Segment labels may be globally significant or locally significant in the network 130, which may be an SR domain. Global segment labels are referred to as node segment identifiers (IDs) and local segment labels are referred to as adjacency segment IDs. For example, the first segment label 72 and the third segment label 65 are global segment labels, whereas the second segment label 9003 is a local segment label. Global segment labels are managed and/or allocated by an operator of the network 130 and/or the network controller 110, whereas local segment labels are assigned by the network nodes 120. For example, during a network setup phase, the network controller 110 creates, establishes, and/or collects all labeling information of the network 130. Subsequently, the network controller 110 selects routes through the network nodes 120 for transporting traffic in the network 130. A route may be identified by a list of segment labels. For example, a route from the network node A 120 to the network node I 120 is identified by a segment label list {72, 9003, 65}.

The network nodes 120 may be switches, routers, bridges, and/or any other network devices suitable for forwarding data in the network 130. In an embodiment of an SDN network, each network node 120 receives forwarding instructions from the network controller 110 and forwards data packets in the network 130 according to the received forwarding instructions. In the network 130, the network nodes 120 may act as an ingress node, an egress node, and/or a transit node for one or more packet flows, for example, associated with different sources 150 and/or different destinations 160.

When a network node 120 is an ingress node, the network node 120 is configured to direct packets from a source 150 through the network 130 towards a destination 160 of the packets. For example, the network node 120 receives a plurality of routes from the network controller 110 for routing packets through the network 130 and stores the plurality of routes, for example, in a flow table or any other forwarding information bases. Upon receiving a packet from the source 150, the network node 120 identifies a route stored in the flow table, for example, via source-destination match, encapsulates the packet with the route, for example, in a packet header, and forwards the packet to a next hop node according to the identified route. For example, to forward a packet from the network node A 120 to the network node I 120, the packet is encapsulated with a packet header comprising an ordered list of segment labels represented by {72, 9003, 65}.

When a network node 120 is a transit node, the network node 120 is physically and/or logically located between an ingress node and an egress node of a forwarding path. The network node 120 is configured to receive and forward packets in the network 130 via stateless connections. For example, when the network node 120 receives a packet from an upstream node, the network node 120 forwards the packet to a downstream node according to the route information carried in the header that is encapsulated on the packet without referencing a connection-specific table. An upstream node is a node towards a source 150, whereas a downstream node is a node towards a destination 160. In some embodiments, each transit node performs a label pop operation on the label stack carried in a packet to expose a next segment prior to forwarding the packet.

When a network node 120 is an egress node, the network node 120 is configured to deliver packets to a destination 160 of the packets. For example, upon receiving a packet for the destination 160, the network node 120 removes the packet header that carries the routes that were used to forward the packet through network 130 prior to transmitting the packet to its destination 160.

As shown in FIG. 1, the source 150 is connected to the network node A 120, and the destination 160 is connected to the network node I 120. The network controller 110 selects a route identified by the segment label list {72, 9003, 65} for forwarding packets between the source 150 and the destination 160. The route is referred to as a tunnel or a LSP 171. Thus, the network node A 120 and the network node I 120 are referred to as an ingress node and an egress node for the LSP 171, respectively. The network controller 110 creates or establishes the LSP 171 by configuring the network nodes 120 along the LSP 171 with corresponding forwarding instructions. The network controller 110 reserves link resources such as bandwidths on the links 131 that are traversed by the LSP 171. Thus, the network nodes 120 do not manage resource reservation, and thus the network 130 does not employ the RSVP.

Figure 2:
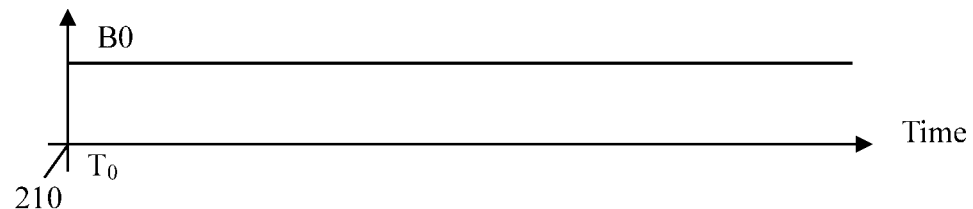
FIG. 2 is a timing diagram of a time agnostic link bandwidth profile.

FIG. 2 is a timing diagram of an embodiment of a time agnostic bandwidth profile 200. The x-axis represents time in some arbitrary constant units. The y-axis represents unreserved bandwidth in some arbitrary constant units. The profile 200 represents the bandwidth profile of a link 131 along the LSP 171. For example, the LSP 171 is created at a current time 210, denoted as $T_0$, and a portion of the bandwidth on the link 131 is reserved for the LSP 171. After the LSP 171 is created, the amount of unreserved bandwidth on the link 131 is shown as B0 from the current time 210 to an indefinite end time or until the LSP 171 is deleted. However, the LSP 171 may only carry traffic over some period of time. Thus, the reserved bandwidth at the other time is idle or not being utilized. Therefore, the network controller 110 may not utilize network resources efficiently.

Disclosed herein are various embodiments for creating a temporal LSP for a predetermined time interval in a SDN network. A temporal LSP is a LSP that is scheduled for carrying traffic in one or more predetermined time intervals instead of indefinitely or until deletion of the LSP. The disclosed embodiments employ a TTS controller to manage creation and deletion of temporal LSPs and configure nodes traversed by the temporal LSPs with forwarding instructions. The TTS controller computes paths satisfying constraints of temporal LSPs in the time intervals scheduled for the temporal LSPs. The TTS controller manages and allocates forwarding labels for nodes and/or links traversed by the temporal LSPs in the scheduled time intervals. The TTS controller maintains and tracks path information associated with the temporal LSPs in the scheduled time intervals. Using LSPs for a predetermined time interval may increase network efficiency and scalability, reduce costs of operation and maintenance of networks, and provide new functions such as LSP tunnel service for a predetermined time interval and LSP tunnel service scheduling.

Figure 3:
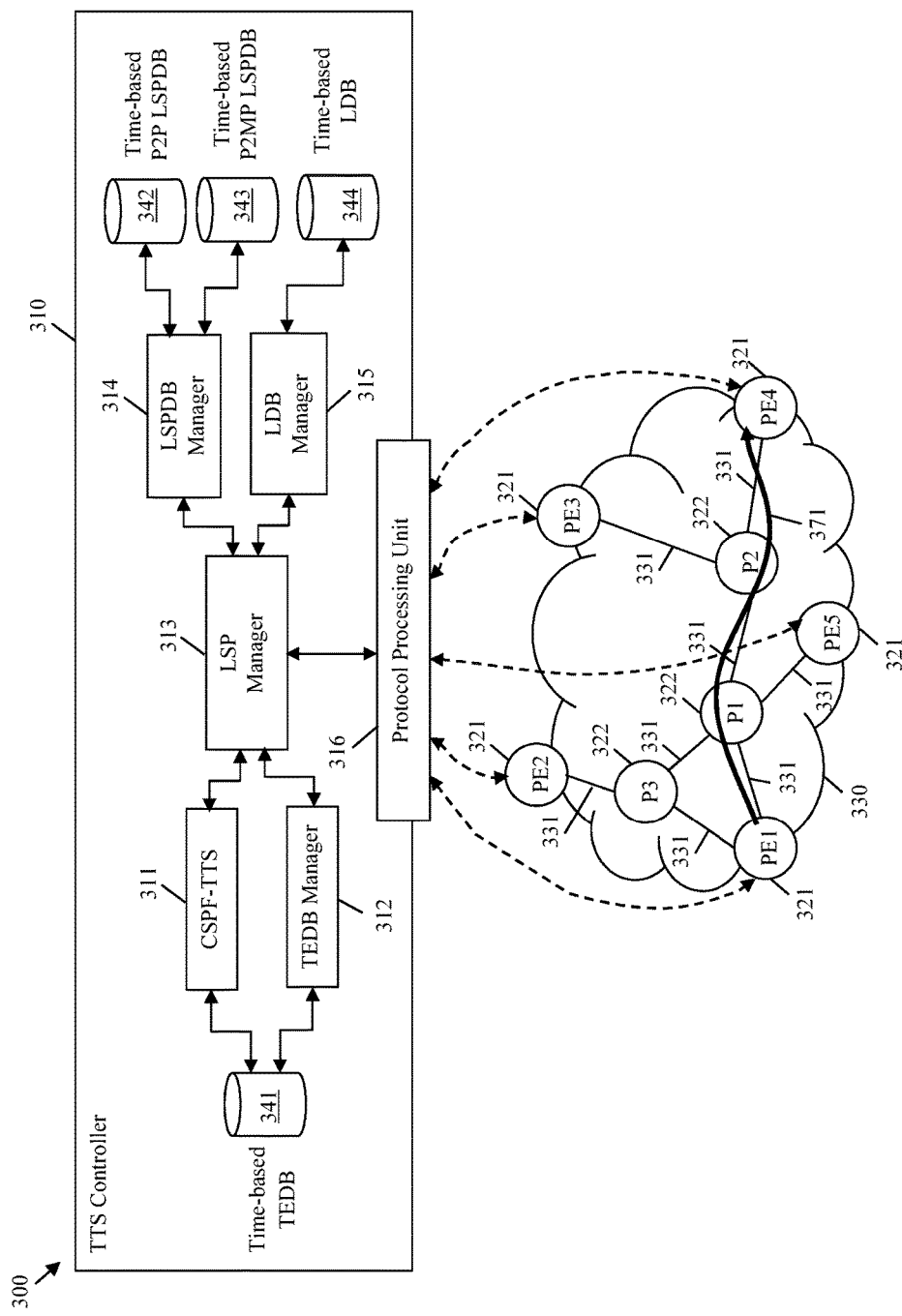
FIG. 3 is a schematic diagram of a SDN system that implements temporal LSPs according to an embodiment of the disclosure.

FIG. 3 is a schematic diagram of a SDN system 300 that implements temporal LSPs according to an embodiment of the disclosure. The system 300 comprises a TTS controller 310 communicatively coupled to a network 330. The network 330 comprises a plurality of edge nodes 321 shown as PE1, PE2, PE3, PE4, and PE5 and a plurality of internal nodes 322 shown as P1, P2, and P3 interconnected by a plurality of links 331. The network 330 is managed and controlled by the TTS controller 310. The edge nodes 321 and the internal nodes 322 are similar to the network nodes 120. The links 331 are similar to the links 131.

The TTS controller 310 may be a VM, a hypervisor, a computer server machine, or any other device configured to manage network resources and label for creation and deletion of temporal LSPs in the network 330 in predetermined or scheduled time intervals. The TTS controller 310 maintains and tracks statuses and states of temporal LSPs in the scheduled time intervals. The TTS controller 310 configures the edge nodes 321 and the internal nodes 322 to forward traffic on temporal LSPs in the scheduled time intervals. Thus, the edge nodes 321 and the internal nodes 322 do not employ the RSVP or label distribute protocol (LDP), or maintain any soft states of the temporal LSPs.

The TTS controller 310 comprises a time-based constrained shortest path first for temporal tunnel service (CSPF-TTS) unit 311, a TEDB manager 312, a LSP manager 313, a LSPDB manager 314, a LDB manager 315, a protocol processing unit 316, a time-based TEDB 341, a time-based P2P LSPDB 342, a time-based P2MP LSPDB 343, and a time-based LDB 344. The LSP manager 313 is coupled to the CSPF-TTS unit 311, the TEDB manager 312, the LSPDB manager 314, the LDB manager 315, and the protocol processing unit 316. The CSPF-TTS unit 311 and the TEDB manager 312 are coupled to the time-based TEDB 341. The LSPDB manager 314 is coupled to the time-based P2P LSPDB 342 and the time-based P2MP LSPDB 343. The LDB manager 315 is coupled to the time-based LDB 344. Time-based refers to the management, maintenance, storage, and/or representation of information by time intervals.

The time-based TEDB 341 is configured to store network resource or traffic engineering (TE) information of the network 330 by time intervals. For example, the time-based TEDB 341 indicates unreserved network resources in a plurality of time intervals, as described more fully below. Some examples of network resource information may include bandwidths, delays, data rates, link types, quality of service (QoS), statuses, and/or any other information associated with the links 331. The TEDB manager 312 is configured to manage the time-based TEDB 341 for network resource reservation.

The CSPF-TTS unit 311 is configured to compute routing paths for temporal LSPs in the network 330 satisfying certain constraints in predetermined time intervals. The CSPF-TTS unit 311 may employ a constrained shortest path first (CSPF) algorithm and consult with the time-based TEDB 341 to compute the routing paths.

The time-based LDB 344 is configured to store segment labels or path labels and corresponding allocation or reservation statuses by time intervals. For example, the time-based LDB 344 indicates availabilities of path labels on each of the nodes in the network 330 in a plurality of time intervals. The LDB manager 315 is configured to reserve and/or release path label from and/or to the time-based LDB 344 as requested by the LSP manager 313.

The time-based P2P LSPDB 342 is configured to store global IDs, segment labels or path labels, and path information associated with temporal P2P LSPs in the network 330 by time intervals. The time-based P2MP LSPDB 343 is configured to store global IDs and path information associated with temporal P2MP LSPs in the network 330 by time intervals. For example, the time-based P2P LSPDB 342 and the time-based P2MP LSPDB 343 indicate the paths computed for temporal LSPs, the labels and traffic engineering resources such as link bandwidths reserved for the temporal LSPs in a plurality of time intervals. A P2P LSP comprises a single ingress node and a single egress node in the network 330, whereas a P2MP LSP comprises a single ingress node and multiple egress nodes in the network 330. Each P2P LSP or each P2MP LSP is identified by a unique global ID. In an embodiment, the time-based P2P LSPDB 342 may comprise a first range of global IDs reserved for P2P LSP allocations and the time-based P2MP LSPDB 343 may comprise a second range of global IDs reserved for P2MP LSP allocations, where the first range and the second range of global IDs are non-overlapping global IDs.

The LSPDB manager 314 is configured to store and/or remove path information about temporal LSPs in and/or from the time-based P2P LSPDB 342 and the time-based P2MP LSPDB 343 as requested by the LSP manager 313. When a global ID is allocated to a particular temporal LSP, the path information may include a node sequence for the LSP, a path state of the LSP, time intervals scheduled for the temporal LSP, labels reserved for the temporal LSP in the scheduled time intervals, and network resources reserved for the temporal LSP in the scheduled time intervals. As an example, a node sequence for a temporal LSP 371 may be stored in the form of {PE4←P2←P1←PE1} to indicate that the temporal LSP 371 traverses from the edge node PE1 321, followed by the internal nodes P1 and P2 322, and to the edge node PE4 321.

A link that connects a node to a previous hop node along an LSP is referred to as an incoming link of the node. For example, the link 331 from the node PE1 321 to the node P1 322 is an incoming link of the node P1 322 of the LSP 371. A link that connects a node to a next hop node along an LSP is referred to as an outgoing link of the node. For example, the link 331 from the node P1 322 to the node P2 322 is an outgoing link of the node P1 322 of the LSP 371. For each node except the ingress node along a path of a temporal LSP in a time interval, a label is reserved on the node in the time-based LDB 344 for the incoming link attached to the node in the time interval. The reserved label is stored in the time-based P2P LSPDB 342 or the time-based P2MP LSPDB 343 for the LSP. The label for the incoming link is referred to as an incoming label. The label for the outgoing link is referred to as an outgoing label. For example, from the point of view of the node P1 322, the label reserved on the node P1 322 for the incoming link 331 from the node PE1 321 to the node P1 322 is an incoming label, and the label reserved on the node P2 322 for the incoming link 331 from the node P1 321 to the node P2 322 is an outgoing label since the link 331 from the node P1 321 to the node P2 322 is an outgoing link for the node P1 322.

The protocol processing unit 316 is configured to communicate with the edge nodes 321 and the internal nodes 322 as requested by the LSP manager 313. The protocol processing unit 316 may implement an IGP, a BGP, a PCEP, an OpenFlow protocol, or any suitable network communication protocol.

The LSP manager 313 is configured to manage and control creation and deletion of temporal LSPs in the network 330. Upon receiving a request to create a temporal LSP in a time interval, the LSP manager 313 coordinates with the CSPF-TTS unit 311 to compute a shortest path satisfying the constraints for the LSP in the time interval. The LSP manager 313 coordinates with the TEDB manager 312 to reserve bandwidth on each link 331 traversed by the temporal LSP from the time-based TEDB 341. The LSP manager 313 coordinates with the LDB manager 315 to reserve a label on each edge node 321 and each internal node 322 traversed by the temporal LSP except on the ingress of the LSP. The LSP manager 313 coordinates with the LSPDB manager 314 to allocate a global ID to identify the temporal LSP from the time-based P2P LSPDB 342 and stores information about the temporal LSP in the time-based P2P LSPDB 342. The LSP manager 313 coordinates with the protocol processing unit 316 to write a cross connect on each edge node 321 and each internal node 322 traversed by the temporal LSP. After creating the temporal LSP, the LSP manager 313 updates the status of the temporal LSP and notifies the user or application that the temporal LSP is established.

Upon receiving a request to delete the temporal LSP, the LSP manager 313 coordinates with the TEDB manager 312 to release the reserved bandwidth in remaining time intervals to the time-based TEDB 341. The LSP manager 313 coordinates with the LDB manager 315 to release the reserved labels in remaining time intervals to the time-based LDB 344. The LSP manager 313 coordinates with the LSPDB manager 314 to release the reserved global ID to the time-based P2P LSPDB 342 and remove information about the temporal LSP from the time-based P2P LSPDB 342. The LSP manager 313 coordinates with the protocol processing unit 316 to remove the cross connect on each edge node 321 and each internal node 322 traversed by the temporal LSP. The LSP manager 313 updates the status of the temporal LSP and notifies the user or application that the temporal LSP is deleted. The LSP manager 313 may employ similar mechanisms to create and/or delete P2MP LSPs.

It should be noted that in some embodiments, any of the CSPF-TTS unit 311, the TEDB manager 312, the LSP manager 313, the LSPDB manager 314, the LDB manager 315, the protocol processing unit 316, the time-based TEDB 341, the time-based P2P LSPDB 342, the time-based P2MP LSPDB 343, and the time-based LDB 344 may reside external to the TTS controller 310 and may be alternatively arranged as determined by a person of ordinary skill in the art to achieve similar functionalities.

Figure 4:
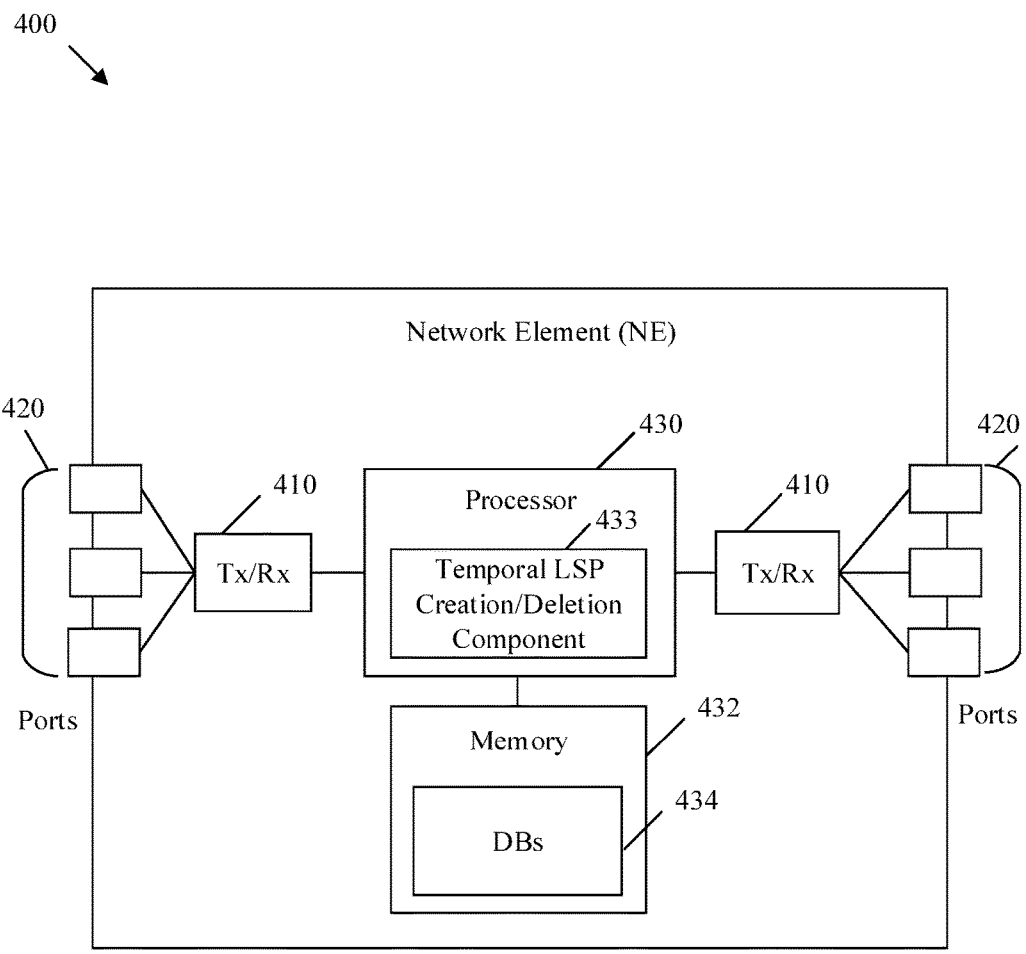
FIG. 4 is a schematic diagram of an NE according to an embodiment of the disclosure.

FIG. 4 is a schematic diagram of an NE 400 within a network such as the systems 100 and 300 according to an embodiment of the disclosure. For example, NE 400 may act as the network controller 110, the TTS controller 310, the network nodes 120, the edge nodes 321, the internal nodes 322, the source 150, the destination 160, and/or any other network node in the systems 100 and 300. NE 400 may be configured to implement and/or support the temporal LSP creation and deletion mechanisms and schemes described herein. NE 400 may be implemented in a single node or the functionality of NE 400 may be implemented in a plurality of nodes. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments.

At least some of the features/methods described in the disclosure are implemented in a network apparatus or component, such as an NE 400. For instance, the features/methods in the disclosure may be implemented using hardware, firmware, and/or software installed to run on hardware. The NE 400 is any device that transports packets through a network, e.g., a switch, router, bridge, server, a client, etc. As shown in FIG. 4, the NE 400 comprises transceivers (Tx/Rx) 410, which may be transmitters, receivers, or combinations thereof. The Tx/Rx 410 is coupled to a plurality of ports 420 for transmitting and/or receiving frames from other nodes.

A processor 430 is coupled to each Tx/Rx 410 to process the frames and/or determine which nodes to send the frames to. The processor 430 may comprise one or more multi-core processors and/or memory devices 432, which may function as data stores, buffers, etc. The processor 430 may be implemented as a general processor or may be part of one or more application specific integrated circuits (ASICs) and/or digital signal processors (DSPs). The processor 430 comprises a temporal LSP creation/deletion component 433, which may perform temporal LSP creation and deletion and may implement methods 900, 1000, 1100, and 1200, as discussed more fully below, and/or any other flowcharts, schemes, and methods discussed herein. As such, the inclusion of the temporal LSP creation/deletion component 433 and associated methods and systems provide improvements to the functionality of the NE 400. Further, the temporal LSP creation/deletion component 433 effects a transformation of a particular article (e.g., the network) to a different state. In an alternative embodiment, the temporal LSP creation/deletion component 433 may be implemented as instructions stored in the memory device 432, which may be executed by the processor 430. Further, in the alternative embodiment, the NE 400 may comprise any other means for implementing the methods 900, 1000, 1100, and 1200.

The memory device 432 may comprise a cache for temporarily storing content, e.g., a random-access memory (RAM). Additionally, the memory device 432 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 432 is configured to store databases (DBs) 434 such as the time-based TEDB 341, the time-based P2P LSPDB 342, the time-based P2MP LSPDB 343, and the time-based LDB 344 depending on the embodiments.

It is understood that by programming and/or loading executable instructions onto the NE 400, at least one of the processor 430 and/or memory device 432 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 5:
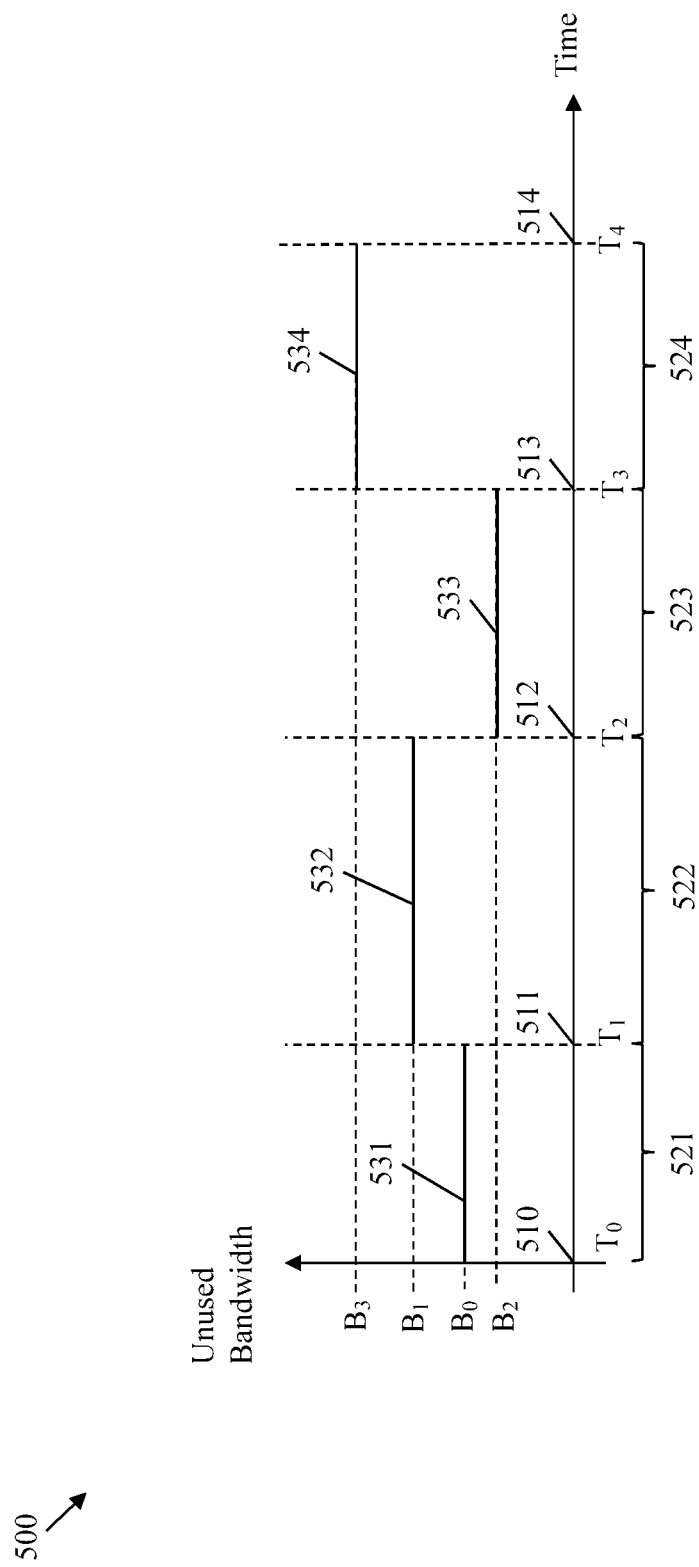
FIG. 5 is a timing diagram of a time-based link bandwidth profile according to an embodiment of the disclosure.

FIG. 5 is a timing diagram of a time-based link bandwidth profile 500 according to an embodiment of the disclosure. The x-axis represents time in some arbitrary constant units. The y-axis represents unreserved bandwidth in some arbitrary constant units. The profile 500 represents the bandwidth profile of a link 331 stored in the time-based TEDB 341. The profile 500 shows unreserved bandwidth at a certain priority level on a link as a function of time, which includes a series of time intervals 521, 522, 523, and 524. As shown, the amount of unreserved bandwidth 531 at the time interval 521 from a time 510, denoted as $T_0$, to a time 511, denoted as $T_1$, is $B_0$. The amount of unreserved bandwidth 532 at the time interval 522 from the time 511 to a time 512, denoted as $T_2$, is $B_1$. The amount of unreserved bandwidth 533 at the time interval 523 from the time 512 to a time 513, denoted as $T_3$, is $B_2$. The amount of unreserved bandwidth 534 at the time interval 524 from the time 513 to a time 514, denoted as $T_4$, is $B_3$. It should be noted that although the profile 500 illustrates four time intervals and a bandwidth for each of the four time intervals for a link, any link may comprise any number of time intervals and a bandwidth for each time interval.

In one embodiment, the profile 500 is recorded in a time-based TEDB using absolute time as shown below:

$[T_0, B_0], [T_1, B_1], [T_2, B_2], [T_3, B_3]$, where $T_0$, $T_1$, $T_2$, and $T_3$ are global clock times in a network such as the system 300 synchronized among all nodes such as the edge nodes 321 and the internal nodes 322 in the network.

In another embodiment, the profile 500 is recorded in a time-based TEDB using relative time as shown below:

$[P_0, B_0], [P_1, B_1], [P_2, B_2], [P_3, B_3]$, where $P_0$, $P_1$, $P_2$, and $P_3$ represent durations of the time intervals 521, 522, 523, and 524, respectively, and $P_0$ begins at a current time $T_0$. When using relative time representations, a node may use a local clock time, which may be different from another node in the network. One approach to implementing the profile 500 is to configure a timer to expire at a unit time, for example, at every second, and use a period variable, denoted as P, to track the expiration of the time intervals 521-524. For example, at time 510, P is set to a duration or a period (e.g., $P_0$) of the time interval 521 according to the unit time. When the timer expires, P is decremented by the unit time and the duration or period (e.g., $P_0$) of a corresponding time interval in the time-based TEDB is updated by P. The expiration of the timer indicates the unit time has elapsed. When P reaches a value of 0, P is set to a duration or a period (e.g., $P_1$) of a next time interval, which is the time interval 522.

Figure 6:
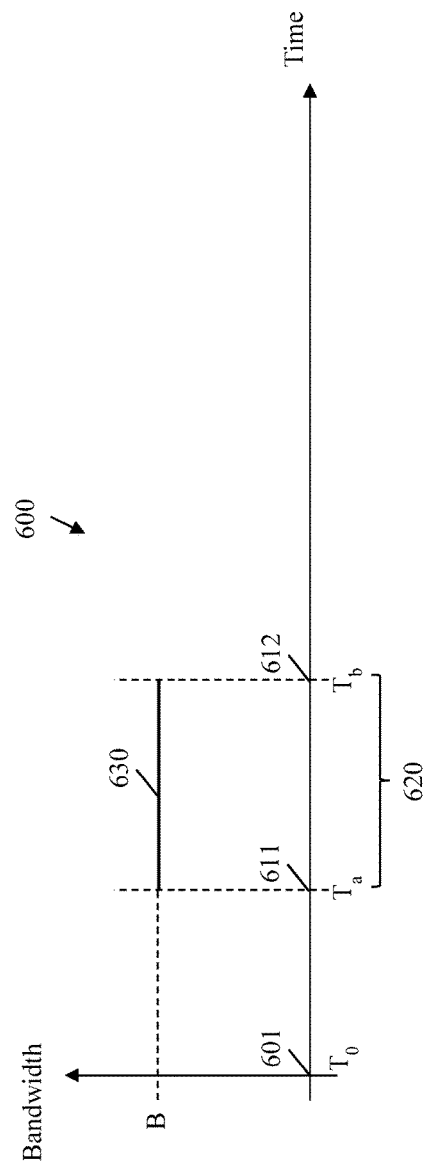
FIG. 6 is a timing diagram of a temporal bandwidth reservation scheme according to an embodiment of the disclosure.
Figure 7:
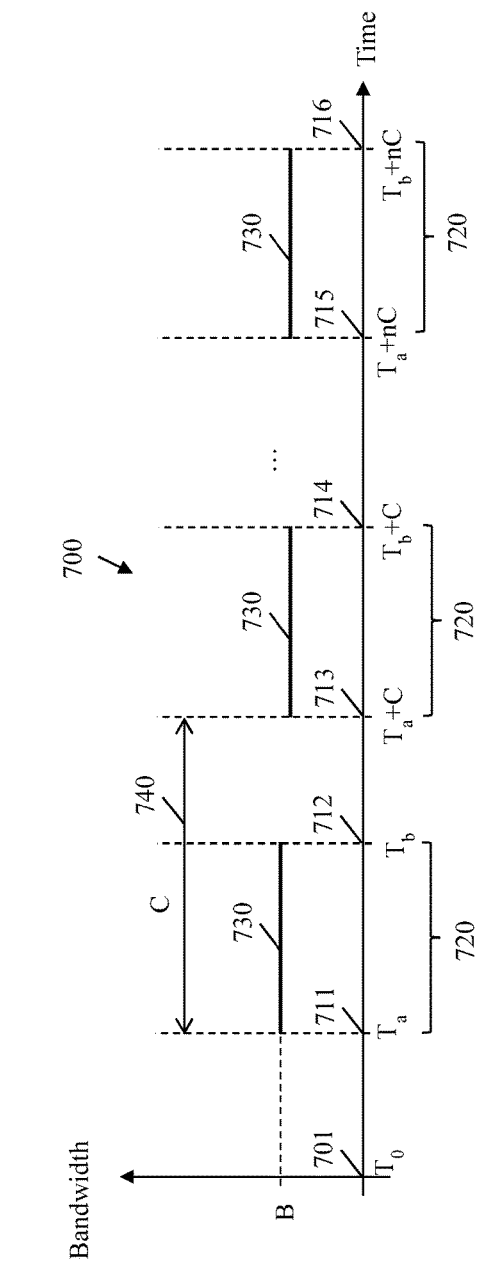
FIG. 7 is a timing diagram of a temporal bandwidth reservation scheme for a series of time intervals according to an embodiment of the disclosure.
Figure 8:
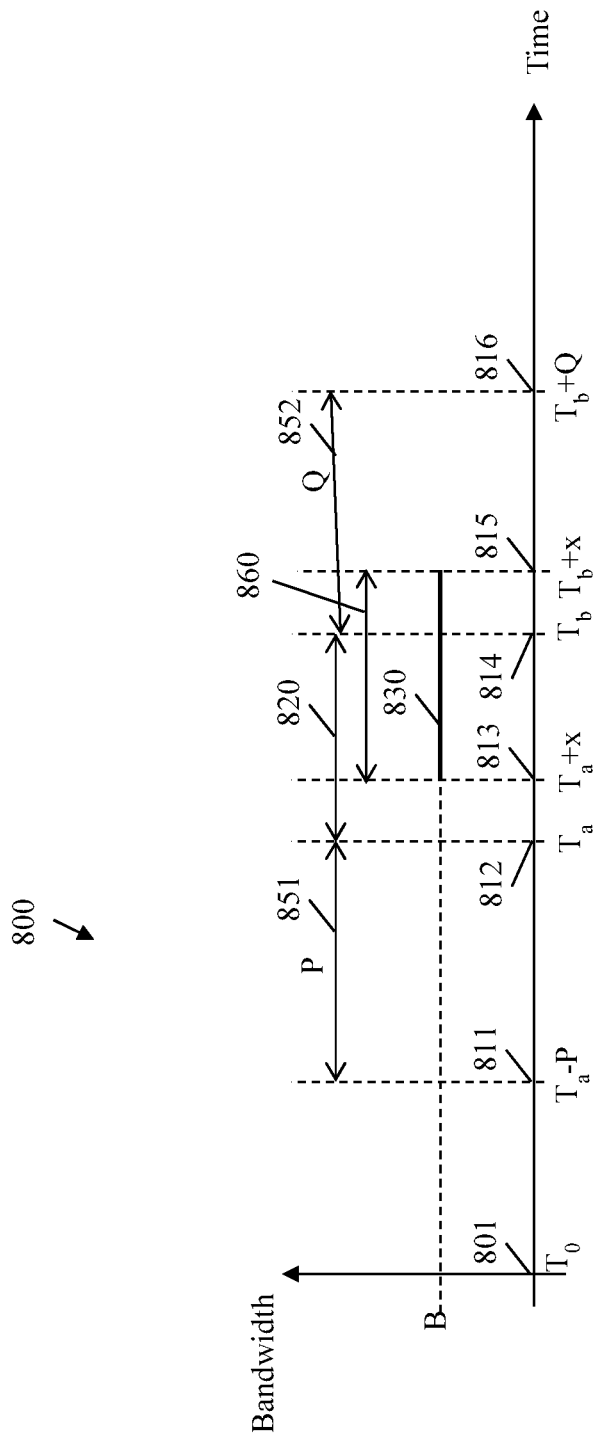
FIG. 8 is a timing diagram of a temporal bandwidth reservation scheme for a time interval with an elastic time range according to an embodiment of the disclosure.

In some other embodiments, the profile 500 is recorded in a time-based TEDB using a combination of absolute time and relative time as shown below:

$T_0, [P_0, B_0], [P_1, B_1], [P_2, B_2], [P_3, B_3]$, where $P_0$, $P_1$, $P_2$, and $P_3$ represent durations of the time intervals 521, 522, 523, and 524, respectively, and $T_0$ represents a start time of the series of time intervals 521-424. The time $T_0$ is an absolute time, which is a global clock time of the network synchronized among all nodes in the network FIGS. 6-8 illustrate several link resource reservation schemes that a TTS controller such as the TTS controller 310 may use to schedule or reserve network resources for temporal LSPs such as the LSP 371. In FIGS. 6-8, the x-axis represents time in some arbitrary units of time and the y-axis represents bandwidth in some arbitrary units of bandwidth. FIG. 6 is a timing diagram of a temporal bandwidth reservation scheme 600 according to an embodiment of the disclosure. For example, at a current time 601, denoted as $T_0$, the TTS controller receives a request from a user or an application to create a temporal LSP for carrying traffic in a single time interval 620 according to certain network constraints including a constraint for a bandwidth 630 in an amount of B. The time interval 620 starts at a time 611, denoted as $T_a$, and ends at a time 612, denoted as $T_b$. Thus, a time schedule for the scheme 600 may be represented as $[T_a, T_b]$.

In response to the request, the TTS controller computes a shortest path for the LSP satisfying the network constraints, for example, using a CSPF-TTS unit such as the CSPF-TTS unit 311, and reserves the bandwidth 630 for the LSP in the requested time interval 620, for example, from a time-based TEDB such as the time-based TEDB 341. Upon receiving a deletion request, the TTS controller releases the bandwidth 630 in remaining time of the time interval 620.

FIG. 7 is a timing diagram of a temporal bandwidth reservation scheme 700 for a series of time intervals 720 according to an embodiment of the disclosure. The scheme 700 is similar to the scheme 600, but reserves a bandwidth repeatedly over the series of time intervals 720. For example, at a current time 701, denoted as $T_0$, the TTS controller receives a request from a user or an application to create a temporal LSP for carrying traffic in the series of time intervals 720 with a repeat cycle 740, denoted as C, according to certain network constraints including as a constraint for a bandwidth 730 in an amount of B. A first of the time intervals 720 starts at a time 711, denoted as $T_a$, and ends at a time 712, denoted as $T_b$. A second of the time intervals 720 starts at a time 713, denoted as $T_a+C$, to time 714, denoted as $T_b+C$. A final time interval 720 starts at a time 715, denoted as $T_a+nC$, to time 716, denoted as $T_b+nC$. Thus, a time schedule for the scheme 700 may be represented as shown below:

$[T_a, T_b], [T_a+C, T_b+C], \ldots, [T_a+n\times C, T_b+n\times C]$, where n represents the number of repeats.

In response to the request, the TTS controller computes a shortest path for the LSP satisfying the network constraints, for example, using a CSPF-TTS unit such as the CSPF-TTS unit 311, and reserves the bandwidth 730 in the each requested time interval 720, for example, from a time-based TEDB such as the time-based TEDB 341. Upon receiving a deletion request, the TTS controller releases the bandwidth 730 in remaining time intervals 720.

FIG. 8 is a timing diagram of a temporal bandwidth reservation scheme 800 for a time interval 820 with an elastic time range according to an embodiment of the disclosure. The scheme 800 is similar to the scheme 600, but reserves bandwidth in the time interval 820 with an elastic range. For example, at a current time 801, denoted as $T_0$, the TTS controller receives a request from a user or an application to create a temporal LSP for carrying traffic in the time interval 820 with an elastic time range according to certain network constraints including a constraint for a bandwidth 830 in an amount of B. The requested time interval 820 starts at a time 812, denoted as $T_a$, and ends at a time 814, denoted as $T_b$, with an elastic range lower bound 851, denoted as P, and an elastic range upper bound 852, denoted as Q. In effect, the time interval 820 may be shifted in time within a time interval from a time 811, denoted as $T_a-P$, to a time 816, denoted as $T_b+Q$. The elastic range lower bound 851 and the elastic range upper bound 852 may be of any duration. For example, the elastic range lower bound 851 may be about 3600 seconds long and the elastic range upper bound 852 may be about 10 hours long.

In response to the request, the TTS controller computes a shortest path for the LSP satisfying the bandwidth 830 constraint, for example, using a CSPF-TTS unit such as the CSPF-TTS unit 311 as close to the requested time interval 820 as possible bounded by the elastic range lower bound 851 and the elastic range upper bound 852. For example, a bandwidth 830 is reserved in a shifted time interval 860 between a time 813, denoted as $T_a+x$, and a time 815, denoted as $T_b+x$, where x satisfies the elastic range lower bound 851 and the elastic range upper bound 852. Thus, a time schedule for the scheme 800 may be represented as shown below:

$[T_a+x, T_b+x]$, where $-P \leq x \leq Q$ and the absolute of x represents a minimum amount of time from $-P$ to Q that is required to shift requested time interval 820 in order to satisfy the requested constraints.

After computing the shortest path for the shifted time interval 860, the TTS controller reserves a bandwidth 830 for the LSP in the shifted time interval 860, for example, from a time-based TEDB such as the time-based TEDB 341. Upon receiving a deletion request, the TTS controller releases the bandwidth 830 in remaining time of the shifted time interval 860. Although the schemes 600-800 are described in the context of bandwidth reservation, the schemes 600-800 are suitable for reserving any resource, such as labels.

Figure 9:
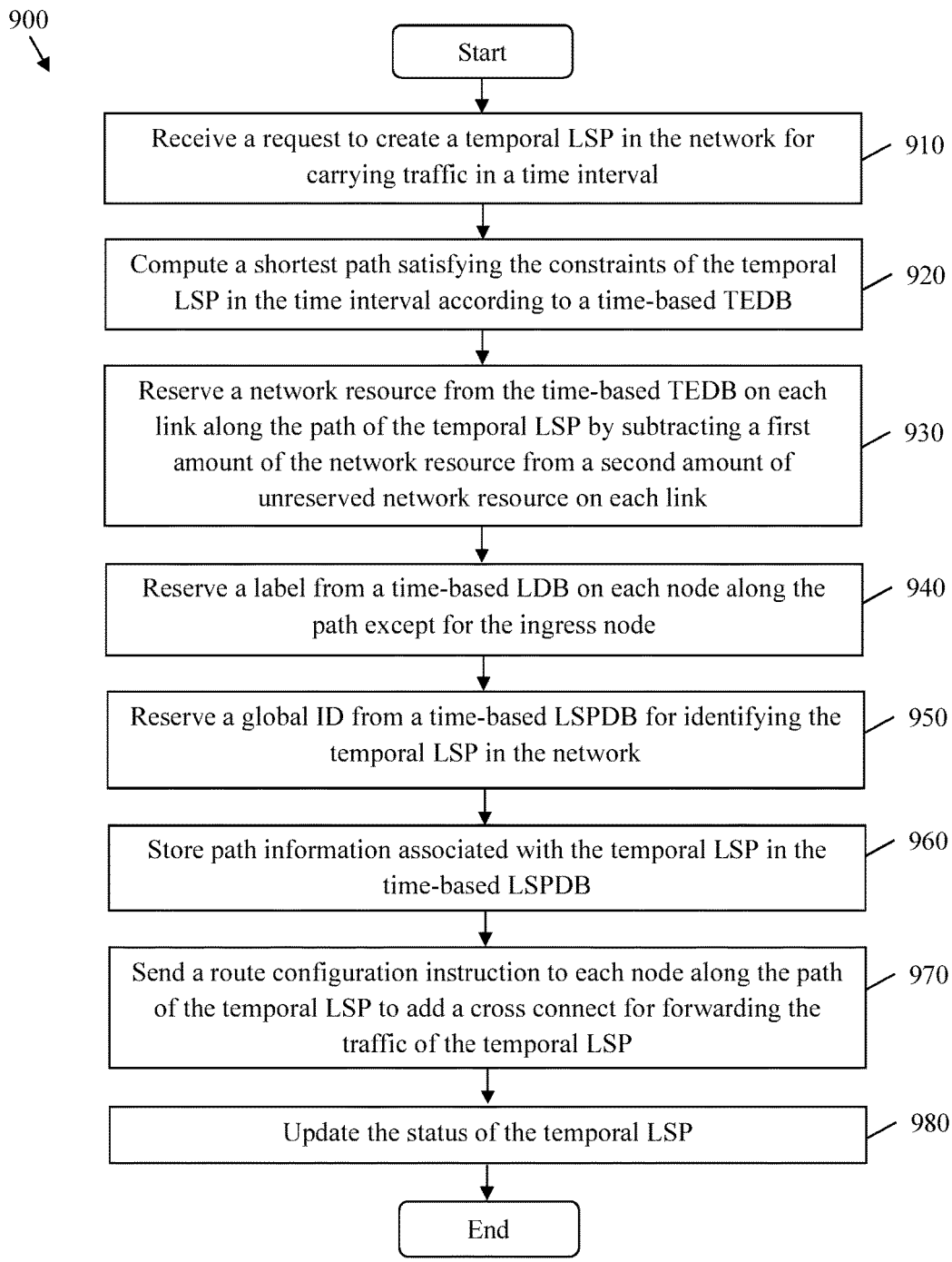
FIG. 9 is a flowchart of a method of creating a temporal LSP according to an embodiment of the disclosure.

FIG. 9 is a flowchart of a method 900 of creating a temporal LSP such as the temporal LSP 371 according to an embodiment of the disclosure. The method 900 is implemented by the TTS controller 310, which may be implemented as the NE 400. The method 900 employs similar temporal LSP creation mechanisms as described in the system 300. The method 900 is implemented when the network controller receives a request to create a temporal LSP. At step 910, a request to create a temporal LSP in the network for carrying traffic in a time interval, such as the time intervals 620, 720, and 820, is received, for example, from a user or an application. The request may indicate constraints of the temporal LSP, timing information about the time interval, and/or traffic information about the traffic. The constraints may include bandwidth, latency, wavelengths, QoS, and/or number of hops. The timing information may include a start time, an end time, a duration, a repeat cycle, and/or an elastic range as described in the schemes 600-800. The traffic information may include a forwarding equivalence class (FEC), an interface index, an interface port, a source such as the source 150, and/or a destination such as the destination 160.

At step 920, a shortest path satisfying the constraints of the temporal LSP in the time interval is computed according to a time-based TEDB such as the time-based TEDB 341, for example, using a CSPF-TTS unit such as the CSPF-TTS unit 311. The shortest path may be computed by employing a CSPF algorithm. The time-based TEDB may indicate unreserved network resources on a link such as the links 331 using the profile 500. When the time interval is a recurring time interval, the path is computed by determining that the path satisfies the network constraint in each recurring time interval. In one embodiment, for each recurring time interval, a path is computed by determining that the path satisfies the network constraint in the time interval. In another embodiment, a path is computed by determining that the path satisfies the network constraint in all the recurring time intervals. When the time interval has an elastic time range, the path is computed by determining a minimum amount of time to shift the time interval from the predetermined start time such that the time interval after shifting satisfies the network constraint and is temporally positioned within the elastic time range.

At step 930, a network resource is reserved from the time-based TEDB on each link along the path of the temporal LSP by subtracting a first amount of the network resource from a second amount of unreserved network resource on each link. For example, the network resource is reserved using a TEDB manager such as the TEDB manager 312. When the time interval is a recurring time interval, the network resource is reserved for each recurring time interval.

At step 940, a label is reserved from a time-based LDB such as the time-based LDB 344 on each node along the path except for the ingress node, for example, using a LDB manager such as the LDB manager 315. The label is reserved for an incoming link attached to the node along the path. When the time interval is a recurring time interval, the label is reserved on the node for each recurring time interval.

At step 950, a global ID is reserved from a time-based LSPDB such as the time-based P2P LSPDB 342 or the time-based P2MP LSPDB 343 for identifying the temporal LSP in the network, for example, using a LSPDB manager such as the LSPDB manager 314. At step 960, path information associated with the temporal LSP is stored in the time-based LSPDB in association with the global ID. The path information may include the global ID, a node sequence (e.g., {PE4←P2←P1←PE1}) of the path from an ingress node such as the edge node PE1 321 to an egress node such as the edge node PE4 321, the network resource reserved for the temporal LSP, the labels reserved for the temporal LSP, a state of the temporal LSP such as a creation status and protection related information, time intervals scheduled for the temporal LSP, or combinations thereof.

At step 970, a route configuration instruction is sent to each node along the path of the temporal LSP to add a cross connect for forwarding the traffic of the temporal LSP. For example, the route configuration instruction is sent using a protocol processing unit such as the protocol processing unit 316. The cross connect instructs the node how to forward packets that the node receives. For example, in the ingress node of the LSP, a cross connect instructs the node to attach a label for the outgoing link of the node to each packet received from a particular port, traffic class, or source and forwards the packet to a particular port or a next hop node. In a transit node of the LSP, a cross connect instructs the node to switch the label for the incoming link in the packet received from the incoming link to the label for the outgoing link and forwards the packet to a particular port or a next hop node. In the egress node of the LSP, a cross connect instructs the node to pop the label for the incoming link in the packet received from the incoming link and forwards the packet to the destination. When the time interval is a recurring time interval, the route configuration instruction is sent at the beginning of each recurring time interval to add the cross connect and a route removal instruction is sent at the end of each recurring time interval to remove the cross connect. When the time interval is a time interval with an elastic range and a shifted time interval is determined within the elastic range, the route configuration instruction is sent at the beginning of the shifted time interval to add the cross connect and a route removal instruction is sent at the end of the shifted time interval to remove the cross connect. When the time interval is a time interval with a start time Ta and an end time Tb, the route configuration instruction is sent at the start time Ta of the time interval to add the cross connect and a route removal instruction is sent at the end time Tb of the time interval to remove the cross connect. A cross connect is also referred to as a forwarding entry.

At step 980, a status of the temporal LSP is updated, for example, to indicate that the temporal LSP is up. The status may be stored in the path information. The network controller may notify the user or the application that the temporal LSP is established after creating the temporal LSP.

It should be noted that the method 900 is suitable for creating a P2P LSP or a P2MP LSP. When creating a P2P LSP, the path computed at the step 920 comprises a single ingress node and a single egress node. When creating a P2MP LSP, the path computed at the step 920 comprises a single ingress node and multiple egress nodes.

Figure 10:
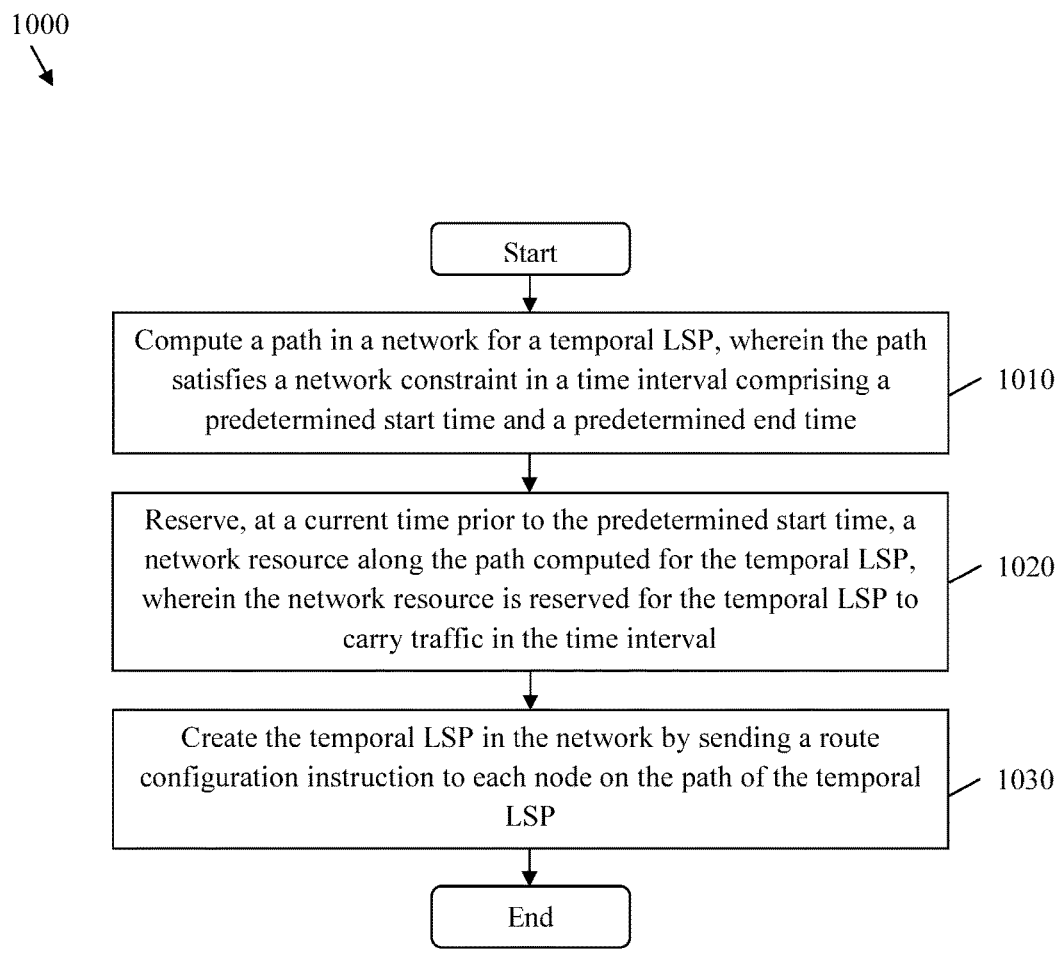
FIG. 10 is a flowchart of a method of creating a temporal LSP according to another embodiment of the disclosure.

FIG. 10 is a flowchart of a method 1000 of creating a temporal LSP such as the temporal LSP 371 according to another embodiment of the disclosure. The method 1000 is implemented by a network controller such as the TTS controller 310, which may be implemented as the NE 400. The 1000 employs similar temporal LSP creation mechanisms as described in the system 300 and the method 900. The method 1000 is implemented when receiving a request for a temporal LSP. At step 1010, a path is computed in a network for a temporal LSP, for example, using a CSPF-TTS unit such as the CSPF-TTS unit 311. The path satisfies a network constraint in a time interval comprising a predetermined start time and a predetermined end time. The constraint and the time interval may be indicated by the request. The constraint may include bandwidth, latency, and/or number of hops. The time interval may be similar to the time intervals 620, 720, and 820.

At step 1020, at a current time prior to the predetermined start time, a network resource is reserved along the path computed for the temporal LSP, for example, using a TEDB manager such as the TEDB manager 312. The network resource is reserved for the temporal LSP to carry traffic in the time interval. The network resource includes link bandwidths on links such as the links 331 along the path and a label on each node along the path except the ingress node of the LSP.

At step 1030, the temporal LSP in the network is created by sending a route configuration instruction to each node on the path of the temporal LSP. The node includes an ingress node such as the edge node PE1 321, an egress node such as the edge node PE4 321, and transit nodes such as the internal node P1 322 on the path of the temporal LSP.

As an example, the route configuration instruction to an ingress node of the LSP comprises an outgoing label and traffic information associated with the traffic such as a source similar to the source 150, a destination similar to the destination 160, an interface index, and/or a FEC. According to the forwarding entry created on the ingress node, when the ingress node receives a packet of the traffic, the ingress node attaches the outgoing label to the packet and sends the packet to a next hop node along the LSP. The route configuration instruction to a transit node of the LSP comprises an incoming label and an outgoing label. According to the forwarding entry created on the transit node, when the transit node receives a packet with the incoming label, the transit node switches the incoming label in the packet with the outgoing label and sends the packet to a next hop node along the LSP. The route configuration instruction to an egress node of the LSP comprises an incoming label. According to the forwarding entry created on the egress node, when the egress node receives a packet with the incoming, the egress node pops or removes the incoming label from the packet and sends the packet without the incoming label to the destination of the packet.

Figure 11:
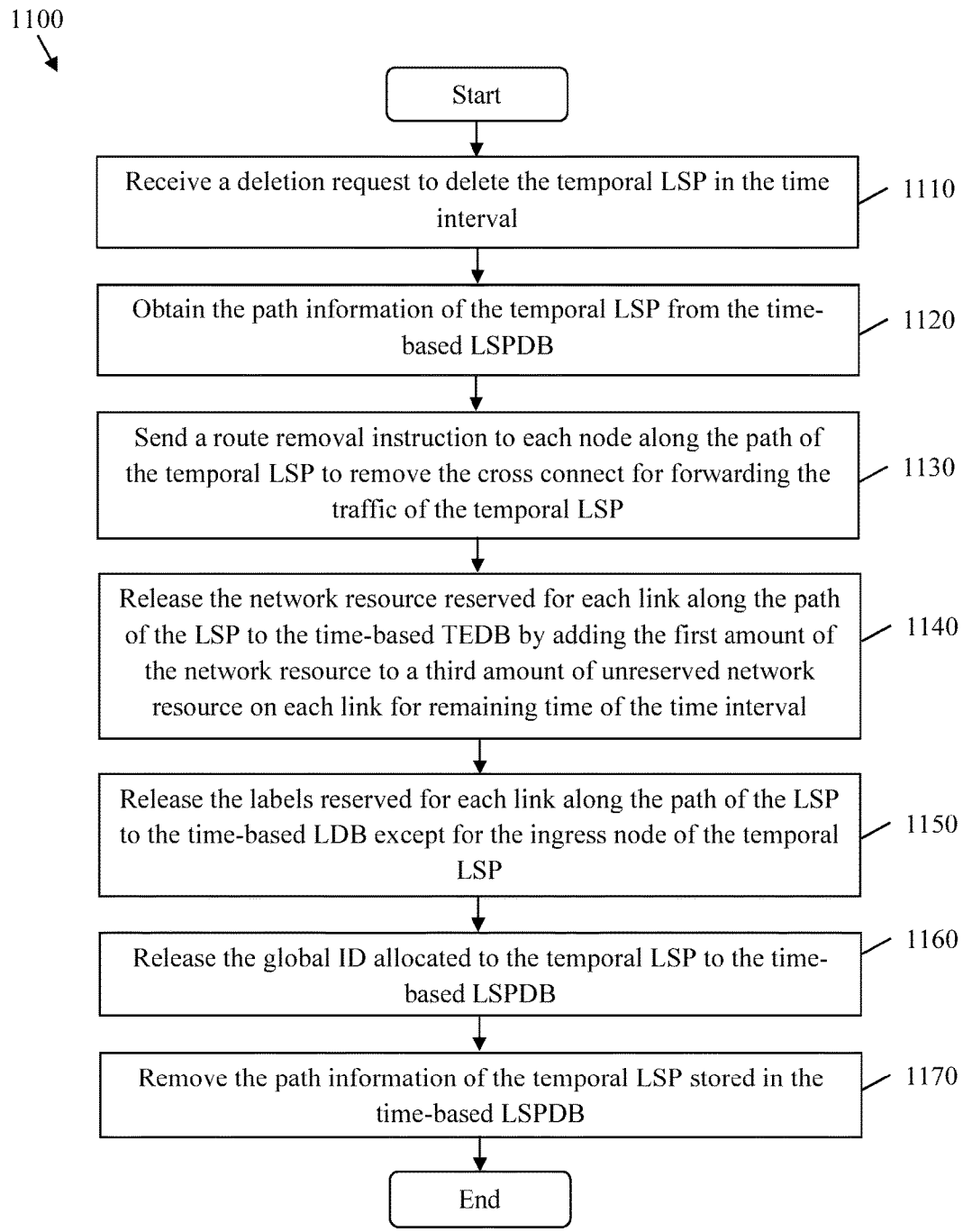
FIG. 11 is a flowchart of a method for deleting a temporal LSP according to an embodiment of the disclosure.

FIG. 11 is a flowchart of a method 1100 for deleting a temporal LSP such as the temporal LSP 371 according to an embodiment of the disclosure. The method 1100 is implemented by a network controller such as the TTS controller 310 which may be implemented as the NE 400. The method 1100 employs similar temporal LSP deletion mechanisms as described in the system 300. The method 1100 is implemented after a temporal LSP is created for carrying traffic in a time interval such as the time intervals 620, 720, and 820, for example, by employing the methods 900 and 1000. The temporal LSP is identified by a global ID allocated, for example, from a time-based LSPDB such as the time-based P2P LSPDB 342 and the time-based P2MP LSPDB 343 and path information associated with the temporal LSP is stored in the time-based LSPDB. A first amount of network resource is reserved on each link such as the links 331 traversed by the temporal LSP, for example, from a time-based TEDB such as the time-based TEDB 341. A path label is reserved for each link, for example, from a time-based LDB such as the time-based LDB 344. Each node traversed by the temporal LSP is configured with routing instructions such as labels for attaching to packets that belong to the temporal LSP.

At step 1110, a deletion request to delete the temporal LSP in the time interval is received, for example, from a user or an application. At step 1120, the path information of the temporal LSP is obtained from the time-based LSPDB. For example, the network controller searches for the path information by the global ID that identifies the temporal LSP.

At step 1130, a route removal instruction is sent to each node along the path of the temporal LSP to remove the cross connect for forwarding the traffic of the temporal LSP. For example, the route removal instruction is sent using a protocol processing unit such as the protocol processing unit 316.

At step 1140, the network resource reserved for each link along the path of the LSP is released to the time-based TEDB by adding the first amount of the network resource to a third amount of unreserved network resource on each link for remaining time in the time interval.

At step 1150, the labels reserved for each link along the path of the LSP are released to the time-based LDB except for the ingress node of the temporal LSP. At step 1160, the global ID allocated to the temporal LSP is released to the time-based LSPDB. At step 1170, the path information of the temporal LSP stored in the time-based LSPDB is removed from the time-based LSPDB.

Figure 12:
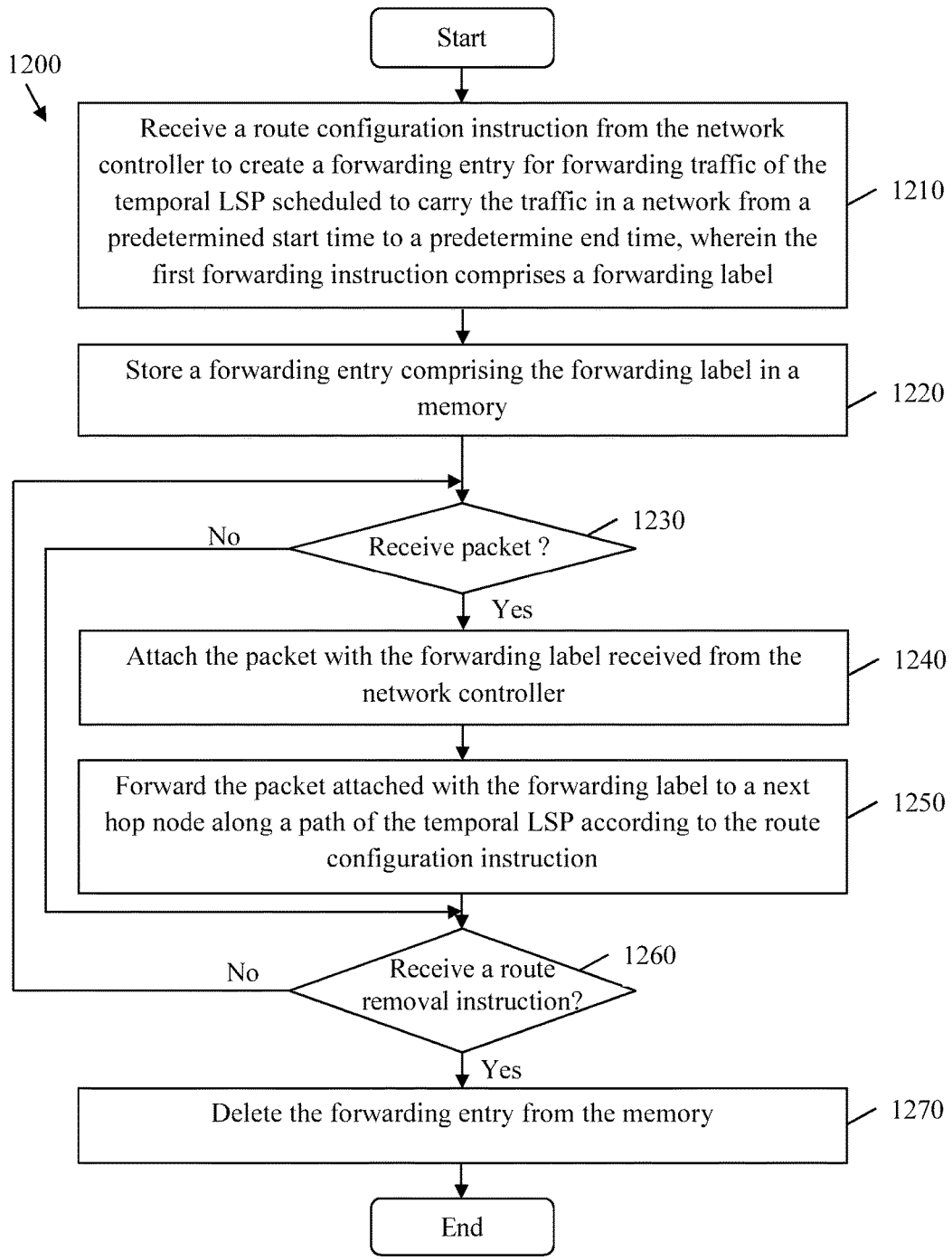
FIG. 12 is a flowchart of a method of performing data forwarding over a temporal LSP in a network according to an embodiment of the disclosure.

FIG. 12 is a flowchart of a method 1200 of performing data forwarding over a temporal LSP such as the temporal LSP 371 in a network such as the system 300 according to an embodiment of the disclosure. The method 1200 is implemented by a node such as the edge nodes 321 and the internal nodes 211, any of which may be implemented as the NE 400. The method 1200 is implemented after a temporal LSP is created in the network. For example, a network controller such as the TTS controller 310 creates the temporal LSP by employing the methods 900 and 1000 and the node is traversed by the temporal LSP. The node does not employ the RSVP or the LDP for resource reservation or label distribution, respectively. At step 1210, a route configuration instruction is received from the network controller to create a forwarding entry for forwarding traffic of the temporal LSP scheduled to carry the traffic in a network from a predetermined start time to a predetermined end time. The route configuration instruction comprises a forwarding or an outgoing label for the ingress node of the LSP, an incoming label and an outgoing label for a transit node of the LSP, and an incoming label for the egress node of the LSP. At step 1220, a forwarding entry comprising the forwarding or outgoing label is stored in a memory such as the memory device 432 of the node. The forwarding entry may comprise traffic information associated with the traffic such as a source similar to the source 150, a destination similar to the destination 160, an interface index, and/or a FEC. When the node is an ingress node of the LSP, the forwarding entry comprises the forwarding or outgoing label. When the node is a transit node of the LSP, the forwarding entry comprises the incoming label and outgoing. When the node is an egress node of the LSP, the forwarding entry comprises the incoming label.

At step 1230, a determination is made whether a packet associated with the traffic of the temporal LSP is received. When a packet is received, the method 1200 proceeds to step 1240, otherwise the method 1200 proceeds to step 1260. At step 1240, the packet is attached with the forwarding or outgoing label received from the network controller. For example, a match is found between the packet and the traffic information in the forwarding entry and the forwarding or outgoing label is retrieved from the forwarding entry. When the node is an ingress node of the LSP, the node attaches the forwarding or outgoing label to the packet. When the node is a transit node of the LSP, the node replaces the incoming label in the packet with the outgoing label according to the forwarding entry. When the node is an egress node of the LSP, the node pops or removes the incoming label from the packet according to the forwarding entry. At step 1250, the packet attached with the forwarding or outgoing label is forwarded to a next hop node along a path of the temporal LSP according to the forwarding entry created from the route configuration instruction. When the node is an ingress node or a transit node of the LSP, the packet with the outgoing label is sent to a next hop node along the path of the LSP according to the forwarding entry. When the node is an egress node of the LSP, the packet is sent to the destination of the packet according to the forwarding entry.

At step 1260, a determination is made whether a route removal instruction is received from the network controller. When a route removal instruction is received, the method 1200 proceeds to step 1270. Otherwise, the method 1200 repeats the steps of 1230-1260. The route removal instruction instructs the node to remove the forwarding entry used for forwarding the traffic of the temporal LSP. At step 1270, the forwarding entry is deleted from the memory and the method 1200 terminates. It should be noted that packets are received between the predetermined start time and the predetermined end time. The route removal instruction is received when the predetermined end time has elapsed or when a user or an application requests the network controller to delete the temporal LSP.

In an embodiment, an NE includes means for computing a path in a network for a temporal LSP, wherein the path satisfies a network constraint in a time interval comprising a predetermined start time and a predetermined end time, means for reserving, at a current time prior to the predetermined start time, a network resource along the path computed for the temporal LSP, wherein the network resource is reserved for the temporal LSP to carry traffic in the time interval, and means for creating the temporal LSP in the network by sending, via a transmitter of the NE, a route configuration instruction to each node on the path of the temporal LSP.

In an embodiment, an NE includes means for receiving a route configuration instruction from a network controller to create a forwarding entry for forwarding traffic of a temporal LSP scheduled to carry the traffic in a network from a predetermined start time to a predetermined end time, wherein the route configuration instruction comprises a forwarding label, and means for receiving a packet associated with the traffic of the temporal LSP at a time between the predetermined start time and the predetermined end time, means for attaching the packet with the forwarding label received from the network controller, and means for forwarding the packet attached with the forwarding label to a next hop node along a path of the temporal LSP according to the forwarding entry.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method implemented by a network element (NE) configured as a temporal tunnel service (TTS) controller, comprising:
    receiving, via a receiver of the NE, a creation request to create a temporal label switched path (LSP) in a network for carrying traffic in a time interval;
    computing, via a processor of the NE, a path in the network for the temporal LSP, wherein the path satisfies a network constraint in the time interval comprising a predetermined start time and a predetermined end time;
    reserving, at a current time prior to the predetermined start time via the processor, a network resource along the path computed for the temporal LSP based on the creation request, wherein the network resource is reserved for the temporal LSP to carry traffic in the time interval; and
    sending, via a transmitter of the NE, a route configuration instruction to a node in the network to create the temporal LSP in the network.

2. The method of claim 1, wherein reserving the network resource comprises:
    reserving a bandwidth on a link along the path in the time interval for the temporal LSP; and
    reserving a label on each node on the path in the time interval except an ingress node of the temporal LSP.

3. The method of claim 1, wherein the creation request indicates the network constraint, the predetermined start time, and the predetermined end time, and wherein the path is computed in response to the creation request.

4. The method of claim 3, wherein the creation request further indicates at least one of a first absolute time of the predetermined start time, a second absolute time of the predetermined end time, a relative time of the predetermined start time, or a period of the time interval.

5. The method of claim 3, wherein the creation request further indicates that the time interval is a recurring time interval, wherein computing the path in the network comprises determining that the path satisfies the network constraint in each recurring time interval, wherein reserving the network resource comprises reserving the network resource for each recurring time interval, wherein sending the route configuration instruction to each node comprises sending the route configuration instruction at a beginning of each recurring time interval for creating a forwarding entry, and wherein the method further comprises sending a route removal instruction to each node to remove the forwarding entry at an end of each recurring time interval.

6. The method of claim 3, wherein the creation request further indicates that the time interval further comprises an elastic time range, and wherein computing the path in the network further comprises determining a minimum amount of time to shift the time interval from the predetermined start time such that the time interval after shifting satisfies the network constraint and is temporally positioned within the elastic time range.

7. The method of claim 1, further comprising:
    allocating, via the processor, a global identifier (ID) for identifying the temporal LSP in the network; and
    storing, in a memory of the NE, path information associated with the temporal LSP, wherein the path information indicates at least one of the label, the global ID, the network resource, the time interval, a nodes sequence on the path, or a status of the temporal LSP.

8. The method of claim 7, further comprising:
    receiving, via a receiver of the NE, a deletion request to delete the temporal LSP from the network;
    releasing, via the processor, the network resource reserved for the temporal LSP;
    releasing, via the processor, the global ID allocated for identifying the temporal LSP;
    deleting, from the memory, the path information associated with the temporal LSP; and
    deleting the temporal LSP by sending, via the transmitter, a route removal instruction to each node to remove a forwarding entry for forwarding the traffic of the temporal LSP.

9. The method of claim 8, wherein the time interval is a recurring time interval, wherein releasing the network resource comprises releasing the network resource in each remaining recurring time interval, and wherein releasing the label comprises releasing the label in each remaining recurring time interval.

10. The method of claim 1, wherein the temporal LSP is a point-to-point (P2P) LSP.

11. The method of claim 1, wherein the temporal LSP is a point-to-multipoint (P2MP) LSP.

12. A network controller comprising:
    a memory;
    a receiver configured to receive a creation request to create a temporal label switched path (LSP) in a network for carrying traffic in a time interval;
    a processor at least partially implemented in hardware and coupled to the memory and the receiver, wherein the processor is configured to:
        compute a path in the network for the temporal LSP, wherein the path satisfies a network constraint in the time interval comprising a predetermined start time and a predetermined end time; and
        reserve, at a current time prior to the predetermined start time, a network resource along the path computed for the temporal LSP based on the creation request, wherein the network resource is reserved for the temporal LSP to carry traffic in the time interval; and a transmitter coupled to the processor and configured to send a route configuration instruction to a node in the network.

13. The network controller of claim 12, wherein the creation request indicates the network constraint and the time interval, wherein the path is computed in response to the creation request, and wherein the network controller further comprises a receiver coupled to the processor and configured to receive a deletion request to delete the temporal LSP from the network, wherein the processor is further configured to release the network resource reserved for the temporal LSP in response to the deletion request, and wherein the transmitter is further configured to send a route removal instruction to each node indicating removal of a forwarding entry for forwarding the traffic of the temporal LSP in response to the deletion request.

14. The network controller of claim 13, further comprising a memory coupled to the processor and configured to store a time-based traffic engineering link state database (TEDB) indicating unreserved network resource in a plurality of time intervals comprising the time interval, wherein the processor is further configured to:
  compute the path by determining that the path satisfies the network constraint in the time interval according to unreserved network resource indicated in the time-based TEDB;
  reserve the network resource from the time-based TEDB by subtracting a first amount of the network resource from a second amount of unreserved network resource in the time interval; and
  release the network resource to the time-based TEDB by adding the first amount of the network resource to a third amount of unreserved network resource for remaining time of the time interval.

15. The network controller of claim 14, wherein the network resource comprises a bandwidth on a link along the path and a label for each node along the path, and wherein the bandwidth is at a first priority of a plurality of bandwidth priorities associated with the link.

16. The network controller of claim 13, further comprising a memory coupled to the processor and configured to store a time-based label database (LDB) indicating availabilities of the label on a second node in a plurality of time intervals comprising the time interval, wherein the processor is further configured to:
  reserve the label on the second node from the time-based LDB by indicating in the time-based LDB that the label is reserved for the time interval; and
  release the label on the second node to the time-based LDB by indicating in the time-based LDB that the label on the second node is available for remaining time of the time interval.

17. The network controller of claim 13, further comprising a memory coupled to the processor and configured to store a time-based LSP database (LSPDB) indicating availabilities of a global identifier (ID), wherein the processor is further configured to:
  allocate the global ID from the time-based LSPDB for identifying the temporal LSP in the network in response to the creation request by indicating in the time-based LSPDB that the global ID is allocated;
  store path information of the temporal LSP in association with the global ID in the time-based LSPDB;
  release the global ID to the time-based LSPDB in response to the deletion request by indicating in the time-based LSPDB that the global ID is available; and
  delete the path information from the time-based LSPDB in response to the deletion request.

18. A network element (NE) comprising:
  a memory;
  a receiver configured to:
    receive a route configuration instruction from a network controller to create a forwarding entry for forwarding traffic of a temporal label switched path (LSP) scheduled to carry the traffic in a network from a predetermined start time to a predetermined end time, wherein the route configuration instruction comprises a forwarding label; and
    receive a packet associated with the traffic of the temporal LSP at a time between the predetermined start time and the predetermined end time;
  a processor at least partially implemented in hardware and coupled to the receiver and the memory, wherein the processor is configured to attach the packet with the forwarding label received from the network controller; and
  a transmitter coupled to the processor and configured to forward the packet attached with the forwarding label to a next hop node along a path of the temporal LSP according to the forwarding entry.

19. The NE of claim 18, further comprising a memory coupled to the processor and configured to store the forwarding entry comprising the forwarding label, wherein the receiver is further configured to receive a route removal instruction from the network controller indicating removal of the forwarding entry for forwarding the traffic of the temporal LSP, and wherein the processor is further configured to delete the forwarding entry from the memory.

20. The NE of claim 18, wherein the network is a software-defined networking (SDN) network, and wherein the route configuration instruction is received according to an interior gateway protocol (IGP), a border gateway protocol (BGP), a path computation element (PCE) communication protocol, or an OpenFlow protocol.

* * * * *

UNITED STATES PATENT AND TRADEMARK OFFICE
CERTIFICATE OF CORRECTION

PATENT NO. : 10,200,280 B2
APPLICATION NO. : 15/178151
DATED : February 5, 2019
INVENTOR(S) : Huaimo Chen It is certified that error appears in the above-identified patent and that said Letters Patent is hereby corrected as shown below:

On the Title Page

Page 2, First Column, Other Publications, Lines 4-6, should read:
Crabbe, E., et al, "PCEP Extensions for Stateful PCE draft-ietf-pce-stateful-pce-11," PCE Working Group, Standards Track, Apr. 20, 2015, 47 pages.

Signed and Sealed this
Twenty-sixth Day of March, 2019

Andrei Iancu
*Director of the United States Patent and Trademark Office*